(12) United States Patent
Schmitt et al.

(10) Patent No.: US 6,723,300 B2
(45) Date of Patent: Apr. 20, 2004

(54) SYNTHESIS OF POROUS CRYSTALLINE MATERIALS IN FLUORIDE MEDIA

(75) Inventors: Kirk D. Schmitt, Pennington, NJ (US); Stephen G. Casmer, Bethlehem, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/367,292

(22) Filed: Feb. 14, 2003

(65) Prior Publication Data

US 2003/0190282 A1 Oct. 9, 2003

Related U.S. Application Data

(60) Provisional application No. 60/364,452, filed on Mar. 15, 2002.

(51) Int. Cl.[7] .......................... C01B 39/42; C01B 39/48
(52) U.S. Cl. ............................ 423/705; 423/DIG. 27; 423/DIG. 33
(58) Field of Search ................. 423/705, 706, 423/707, 708, DIG. 27, DIG. 33

(56) References Cited

U.S. PATENT DOCUMENTS

| | | | | |
|---|---|---|---|---|
| 4,444,738 A | * | 4/1984 | Suzuki et al. ............... | 423/702 |
| 5,082,641 A | * | 1/1992 | Popa et al. .................. | 423/326 |
| 5,171,556 A | * | 12/1992 | Caullet et al. .............. | 423/705 |
| 5,350,722 A | * | 9/1994 | Joly et al. ...................... | 502/64 |

FOREIGN PATENT DOCUMENTS

| | | | | |
|---|---|---|---|---|
| EP | 172068 A | * | 2/1986 | ............ B01J/29/28 |
| EP | WO-9733830 A | * | 9/1997 | |
| WO | WO 8607045 A | * | 12/1986 | ............ B01J/20/06 |

OTHER PUBLICATIONS

Derwent Acc. No. 2000–388263, abstract for CN 1249270, Chen et al. Apr. 2000.*

* cited by examiner

Primary Examiner—David Sample
(74) Attorney, Agent, or Firm—Norby L. Foss (57) ABSTRACT

In a process for synthesizing a porous crystalline material, a mixture capable of forming said material is prepared wherein the mixture comprises sources of water, an oxide of a tetravalent element Y, preferably silicon, an oxide of a trivalent element X, wherein X is selected from the group consisting of aluminum, boron, gallium, iron, and indium, fluoride ions, and an organonitrogen cation $RN^{m+}$ capable of directing the synthesis of said material, wherein the molar ratio of fluoride ions to organonitrogen cations $RN^{m+}$ in said mixture is greater than 1.15 m but less than 2.5 m. The mixture is maintained under crystallization conditions until crystals of said material are formed and the resultant crystalline material is recovered.

11 Claims, 5 Drawing Sheets

SYNTHESIS OF POROUS CRYSTALLINE MATERIALS IN FLUORIDE MEDIA

This is a Non-Provisional Application of Provisional U.S. Serial No. 60/364,452 filed Mar. 15, 2002.

BACKGROUND OF THE INVENTION

This invention relates to the synthesis of porous crystalline materials in fluoride media.

DESCRIPTION OF THE PRIOR ART

Recently, a number of porous crystalline materials have been produced using a synthesis regime that employs hydrofluoric acid as the mineralizer instead of the more conventional alkali hydroxides. Thus, the synthesis of chabazite, ITQ-3, ITQ-4, ITQ-9, SSZ-23, SSZ-24, SSZ-31, CIT-5 and ZSM-12 in fluoride media is disclosed in the article entitled "Synthesis of All-Silica and High-Silica Molecular Sieves in Fluoride Media" by Camblor, M. A.; Villaescusa, L. A.; Diaz-Cabanas, M. J. in Topics in Catalysis 1999, 9, 59–76. However, these syntheses usually produce pure silica or silica/germania polymorphs that are catalytically inactive. In certain cases, the syntheses may be induced to produce boron or aluminum substituted materials, but generally, adding these elements diverts the synthesis to other, undesirable, materials. As is well known, the boron or aluminum is needed to produce materials that have the ion exchange capacity and acidity needed to make active catalysts so the materials produced by these new synthetic methods are often not catalytically active or are contaminated with active materials of an undesired structure.

Current synthesis regimes employing hydrofluoric acid mineralizers normally involve mixing a structure directing agent, usually a quaternary ammonium hydroxide, and tetraethylorthosilicate (TEOS) at high dilution in water and then slowly evaporating water and ethanol at low temperature until the $H_2O/SiO_2$ ratio is reduced to a desired low level. The resulting, often solid, mixture is then mixed by hand with hydrofluoric acid such that the molar ratio of HF/base is at or below 1.1:1.0 and the resulting mixture crystallized under hydrothermal conditions in normal zeolite synthesis apparatus. It is critical that the evaporation of water and ethanol be carried out at low temperature, usually 20–40° C., so the evaporation is tedious. Because the rate of evaporation is a function of surface area/volume, it is impractical to scale the synthesis to more than a few grams and hence it is unsuitable for commercial production.

The present invention seeks to address two important needs related to molecular sieves produced in fluoride media. It allows such materials to be synthesized with reduced impurities in the presence of boron or aluminum and it allows the synthesis to be scaled from a few grams to commercial quantities.

SUMMARY OF THE INVENTION

The present invention is directed to a process for synthesizing a porous crystalline material method which comprises the steps of:

(i) preparing a mixture capable of forming said material, said mixture comprising sources of water, an oxide of a tetravalent element Y, an oxide of a trivalent element X, wherein X is selected from the group consisting of aluminum, boron, gallium, iron, and indium, an organonitrogen cation $RN^{m+}$ capable of directing the synthesis of said material, and fluoride ions, wherein the molar ratio of fluoride ions to organonitrogen cations $RN^{m+}$ in said mixture is greater than 1.15 m but less than 2.5 m;

(ii) maintaining said mixture under crystallization conditions until crystals of said material are formed; and (iii) recovering said crystalline material from step (ii).

Preferably, the molar ratio of fluoride ions to organonitrogen cations $RN^{m+}$ in said mixture is from about 1.25 m to about 1.8 m. Preferably, said tetravalent element Y includes silicon. Preferably, said mixture contains an inorganic source of silica.

DESCRIPTION OF DRAWINGS

FIGS. 1(a), (b) and (c) compare the X-ray diffraction patterns of the as-synthesized products of Examples 1, 2 and 3 respectively.

FIGS. 2(a) and (b) compare the X-ray diffraction patterns of the as-synthesized products of Examples 4 and 5 respectively.

FIGS. 3(a), (b), (c) and (d) compare the X-ray diffraction patterns of the as-synthesized products of Examples 6, 7, 8 and 9 respectively.

FIGS. 4(a), (b), (c) and (d) are enlargements of the X-ray diffraction patterns of the as-synthesized products of Examples 6, 7, 8 and 9 respectively in the area of 19 to 21 degrees 2-theta.

DETAILED DESCRIPTION OF THE PREFERRED EMBODIMENTS

In the process of the invention fluoride media are employed in the production of porous crystalline materials which contain the trivalent elements necessary for catalytic activity, such as boron and aluminum, and which are substantially free of impurity phases. The process not only provides a scalable, fluoride-based method of producing materials, such as zeolite beta, which are generally synthesized in the presence of alkaline mineralizers, but also provides a route to producing pure, catalytically active forms of materials, such as ITQ-13, which to date have required fluoride media for their synthesis.

The process of the invention initially involves preparing a synthesis mixture capable of forming the desired porous crystalline material, said mixture comprising sources of water, an oxide of a tetravalent element Y, normally silicon, an oxide of a trivalent element X, wherein X is selected from the group consisting of aluminum, boron, gallium, iron, and indium, an organonitrogen cation $RN^{m+}$ capable of directing the synthesis of the desired crystalline material, and fluoride ions. The synthesis mixture is prepared such that the molar ratio of fluoride ions to organonitrogen cations $RN^{m+}$ in said mixture is greater than 1.15 m but less than 2.5 m, and more preferably is from about 1.25 m to about 1.8 m. Thus, where the organonitrogen cation is monovalent, the molar ratio of fluoride ions to organonitrogen cations is greater than 1.15 but less than 2.5 and, where the organonitrogen cation is divalent or trivalent, the molar ratio of fluoride ions to organonitrogen cations is greater than 2.3 but less than 5.0 or greater than 3.45 but less than 7.5 respectively.

Where the synthesis mixture contains a source of silica, this source is preferably an inorganic source, such as silica gel or colloidal silica, rather than an organic silica source, such as tetrethylorthosilicate.

The overall composition of the synthesis mixture will vary depending on the particular porous crystalline material to be produced, but in general the mixture will have a composition, in terms of mole ratios of oxides, within the following ranges:

| Reactants | Useful | Preferred |
|---|---|---|
| $YO_2/X_2O_3$ | at least 5 | at least 40 |
| $H_2O/YO_2$ | 2–50 | 5–20 |
| $F/RN^{m+}$ | >1.15 m to <2.5 m | 1.25 m–1.8 m |
| $RN^{m+}/YO_2$ | 0.1/m–1.4/m | 0.2/m–0.8/m |

In addition, the synthesis mixture can contain at least 0.01 percent, preferably 0.10 percent and still more preferably 1 percent, of seed crystals (based on total weight of the mixture) of the desired crystalline product.

The crystallization conditions employed will vary depending on the particular porous crystalline material to be produced, but in general crystallization can be carried out at either static or stirred conditions in a suitable reactor vessel, such as for example, polypropylene jars or Teflon®-lined or stainless steel autoclaves, at a temperature of about 100° C. to about 200° C. for a time sufficient for crystallization to occur at the temperature used, e.g., from about 36 hours to about 30 days. Thereafter, the crystals are separated from the liquid and recovered.

The organonitrogen directing agent employed in the process of the invention depends on the particular porous crystalline material to be produced, but examples of particular directing agents and the known porous cystalline materials that can be produced therewith using the process of the invention are set out below:

| Crystalline Material | Directing Agent |
|---|---|
| Beta | tetraethyl ammonium |
| Chabazite, SSZ-23 |  |
| CIT-5, SSZ-24 |  |
| ITQ-3, ITQ-9, SSZ-31 |  |

-continued

| Crystalline Material | Directing Agent |
|---|---|
| Beta | tetraethyl ammonium |
| ITQ-4 |  |
| ITQ-7 |  |
| ITQ-10 | <br>n = 4 |
| ZSM-12 | <br>n = 6, 8 |

Zeolite beta is described in U.S. Pat. No. 3,308,069, chabazite is described in U.S. Pat. No. 3,248,170, ITQ-3 is described in International Patent Publication No. WO 98/54091, ITQ-4 is described in International Patent Publication No. WO 98/29332, ITQ-7 is described in International Patent Publication No. WO 2000/37360, ITQ-10 is described in Spanish Patent No. 2,155,797, CIT-5 is described in U.S. Pat. No. 6,040,258, SSZ-23 is described in U.S. Pat. No. 4,859,442, SSZ-24 is described in U.S. Pat. No. 4,834,958, SSZ-31 is described in U.S. Pat. No. 5,106,801 and ZSM-12 is described in U.S. Pat. No. 3,832,449. The entire contents of all of the foregoing patent specifications are incorporated herein by reference.

In addition, the process of the invention can be used to produce aluminum-containing versions of the novel crystalline materials ITQ-12, ITQ-13 and EMM-1.

The synthetic porous crystalline material ITQ-12 is described in our co-pending U.S. patent application Ser. No. 09/866,903 and is a single crystalline phase which has a 2-dimensional channel system comprising two sets of intersecting channels wherein each channel is defined by an 8-membered ring of tetrahedrally coordinated atoms. One set of 8-membered ring channels each has cross-sectional dimensions of about 3.4 Angstrom by about 4.6 Angstrom, whereas the other set of 8-membered ring channels each has cross-sectional dimensions of about 2.7 Angstrom by about 4.8 Angstrom.

The structure of ITQ-12 may be defined by its unit cell, which is the smallest structural unit containing all the structural elements of the material. Table 1 lists the positions of each tetrahedral atom in the unit cell in nanometers; each tetrahedral atom is bonded to an oxygen atom which is also bonded to an adjacent tetrahedral atom. Since the tetrahedral atoms may move about due to other crystal forces (presence of inorganic or organic species, for example), a range of ±0.05 nm is implied for each coordinate position.

TABLE 1

| | | | |
|---|---|---|---|
| T1  | 0.645 | 0.369 | 0.088 |
| T2  | 0.563 | 0.599 | 0.569 |
| T3  | 0.547 | 0.598 | 0.263 |
| T4  | 0.153 | 0.369 | 0.767 |
| T5  | 0.236 | 0.599 | 0.285 |
| T6  | 0.252 | 0.598 | 0.591 |
| T7  | 0.153 | 1.132 | 0.767 |
| T8  | 0.236 | 0.902 | 0.285 |
| T9  | 0.252 | 0.904 | 0.591 |
| T10 | 0.645 | 1.132 | 0.088 |
| T11 | 0.563 | 0.902 | 0.569 |
| T12 | 0.547 | 0.904 | 0.263 |
| T13 | 0.129 | 1.120 | 0.088 |
| T14 | 0.046 | 1.350 | 0.569 |
| T15 | 0.030 | 1.348 | 0.263 |
| T16 | 0.670 | 1.120 | 0.767 |
| T17 | 0.752 | 1.350 | 0.285 |
| T18 | 0.769 | 1.348 | 0.591 |
| T19 | 0.670 | 0.381 | 0.767 |
| T20 | 0.752 | 0.152 | 0.285 |
| T21 | 0.769 | 0.153 | 0.591 |
| T22 | 0.129 | 0.381 | 0.088 |
| T23 | 0.046 | 0.152 | 0.569 |
| T24 | 0.030 | 0.153 | 0.263 |

ITQ-12 has an X-ray diffraction pattern which is distinguished from the patterns of other known as-synthesized or thermally treated crystalline materials by the lines listed in Table 2 below.

TABLE 2

| d(Å) | Relative Intensities (I) |
|---|---|
| 8.31 ± 0.2 | m-vs |
| 6.75 ± 0.15 | vw-m |
| 5.63 ± 0.15 | s-vs |
| 4.98 ± 0.15 | vw-m |
| 4.26 ± 0.15 | w |
| 3.49 ± 0.1 | w |
| 3.44 ± 0.1 | m |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacing, d's, were calculated in Angstrom units, and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40), and vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

ITQ-12 has a composition involving the molar relationship: $X_2O_3$:(n)$YO_2$, wherein X is a trivalent element, such as aluminum, boron, iron, indium, and/or gallium, preferably boron; Y is a tetravalent element such as silicon, tin, titanium and/or germanium, preferably silicon; and n is at least 5, such as about 5 to ∞, and usually from about 40 to ∞. It will be appreciated from the permitted values for n that ITQ-12 can be synthesized in totally siliceous form in which the trivalent element X is absent or essentially absent.

The synthesis mixture used to produce ITQ-12 preferably has a composition, in terms of mole ratios of oxides, within the following ranges:

| Reactants | Useful | Preferred |
|---|---|---|
| $YO_2/X_2O_3$ | at least 5 | at least 40 |
| $H_2O/YO_2$ | 2–50 | 5–20 |
| $F/RN^{m+}$ | >1.15 m to <2.5 m | 1.25 m–1.8 m |
| $RN^{m+}/YO_2$ | 0.1–1 | 0.4–0.8 |

The organic directing agent RN used to produce ITQ-12 according to the process of the invention is preferably the 1,3,5-trimethylimadazolium cation and most preferably is 1,3,5-trimethylimadazole hydroxide. 1,3,5-Trimethylimadazole hydroxide can readily be prepared by methylation of commercially available 4- or 5-methylimadazole with methyl iodide followed by anion exchange of the resultant 1,3,5-trimethylimadazole iodide.

Crystallization of ITQ-12 can be carried out at a temperature of about 150° C. to about 200° C. for 12 hours to about 30 days.

The synthetic porous crystalline material ITQ-13 is described in our co-pending U.S. patent application Ser. No. 09/866,907, now U.S. Pat. No. 6,471,941 and is a single crystalline phase that has a unique 3-dimensional channel system comprising three sets of channels. In particular, ITQ-13 comprises a first set of generally parallel channels each of which is defined by a 10-membered ring of tetrahedrally coordinated atoms, a second set of generally parallel channels which are also defined by 10-membered rings of tetrahedrally coordinated atoms and which are perpendicular to and intersect with the channels of the first set, and a third set of generally parallel channels which intersect with the channels of said first and second sets and each of which is defined by a 9-membered ring of tetrahedrally coordinated atoms. The first set of 10-ring channels each has cross-sectional dimensions of about 4.8 Angstrom by about 5.5 Angstrom, whereas the second set of 10-ring channels each has cross-sectional dimensions of about 5.0 Angstrom by about 5.7 Angstrom. The third set of 9-ring channels each has cross-sectional dimensions of about 4.0 Angstrom by about 4.9 Angstrom.

Table 3 lists the positions of each tetrahedral atom in the unit cell of ITQ-13 in nanometers; with a range of ±0.05 nm being implied for each coordinate position.

TABLE 3

| | | | |
|---|---|---|---|
| T1  | 0.626 | 0.159 | 0.794 |
| T2  | 0.151 | 0.151 | 0.478 |
| T3  | 0.385 | 0.287 | 0.333 |
| T4  | 0.626 | 0.158 | 0.487 |
| T5  | 0.153 | 0.149 | 0.781 |
| T6  | 0.383 | 0.250 | 1.993 |
| T7  | 0.473 | 0.153 | 0.071 |
| T8  | 0.469 | 0.000 | 1.509 |
| T9  | 0.466 | 0.000 | 1.820 |
| T10 | 0.626 | 0.979 | 0.794 |

TABLE 3-continued

| | | | |
|---|---|---|---|
| T11 | 1.100 | 0.987 | 0.478 |
| T12 | 0.867 | 0.851 | 0.333 |
| T13 | 0.626 | 0.980 | 0.487 |
| T14 | 1.099 | 0.989 | 0.781 |
| T15 | 0.869 | 0.888 | 1.993 |
| 16 | 0.778 | 0.985 | 0.071 |
| T17 | 0.783 | 0.000 | 1.509 |
| T18 | 0.785 | 0.000 | 1.820 |
| T19 | 0.151 | 0.987 | 0.478 |
| T20 | 0.385 | 0.851 | 0.333 |
| T21 | 0.153 | 0.989 | 0.781 |
| T22 | 0.383 | 0.888 | 1.993 |
| T23 | 0.473 | 0.985 | 0.071 |
| T24 | 1.100 | 0.151 | 0.478 |
| T25 | 0.867 | 0.287 | 0.333 |
| T26 | 1.099 | 0.149 | 0.781 |
| T27 | 0.869 | 0.250 | 1.993 |
| T28 | 0.778 | 0.153 | 0.071 |
| T29 | 0.626 | 0.728 | 1.895 |
| T30 | 0.151 | 0.720 | 1.579 |
| T31 | 0.385 | 0.856 | 1.433 |
| T32 | 0.626 | 0.727 | 1.588 |
| T33 | 0.153 | 0.718 | 1.882 |
| T34 | 0.383 | 0.819 | 0.893 |
| T35 | 0.473 | 0.722 | 1.171 |
| T36 | 0.469 | 0.569 | 0.409 |
| T37 | 0.466 | 0.569 | 0.719 |
| T38 | 0.626 | 0.410 | 1.895 |
| T39 | 1.100 | 0.418 | 1.579 |
| T40 | 0.867 | 0.282 | 1.433 |
| T41 | 0.626 | 0.411 | 1.588 |
| T42 | 1.099 | 0.420 | 1.882 |
| T43 | 0.869 | 0.319 | 0.893 |
| T44 | 0.778 | 0.416 | 1.171 |
| T45 | 0.783 | 0.569 | 0.409 |
| T46 | 0.785 | 0.569 | 0.719 |
| T47 | 0.151 | 0.418 | 1.579 |
| T48 | 0.385 | 0.282 | 1.433 |
| T49 | 0.153 | 0.420 | 1.882 |
| T50 | 0.383 | 0.319 | 0.893 |
| T51 | 0.473 | 0.416 | 1.171 |
| T52 | 1.100 | 0.720 | 1.579 |
| T53 | 0.867 | 0.856 | 1.433 |
| T54 | 1.099 | 0.718 | 1.882 |
| T55 | 0.869 | 0.819 | 0.893 |
| T56 | 0.778 | 0.722 | 1.171 |

ITQ-13 has an X-ray diffraction pattern which is distinguished from the patterns of other known as-synthesized or thermally treated crystalline materials by the lines listed in Table 4 below.

TABLE 4

| D(Å) | Relative Intensities (I) |
|---|---|
| 12.46 ± 0.2 | w-vs |
| 10.97 ± 0.2 | m-vs |
| 10.12 ± 0.2 | vw-w |
| 8.25 ± 0.2 | vw |
| 7.87 ± 0.2 | w-vs |
| 5.50 ± 0.15 | w-m |
| 5.45 ± 0.15 | vw |
| 5.32 ± 0.15 | vw-w |
| 4.70 ± 0.15 | vw |
| 4.22 ± 0.15 | w-m |
| 4.18 ± 0.15 | vw-w |
| 4.14 ± 0.15 | w |
| 3.97 ± 0.1 | w |
| 3.90 ± 0.1 | vw-m |
| 3.86 ± 0.1 | m-vs |
| 3.73 ± 0.1 | m-vs |
| 3.66 ± 0.1 | m-s |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units, and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40), and vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

ITQ-13 has a composition involving the molar relationship:

$$X_2O_3:(n)YO_2,$$

wherein X is a trivalent element, such as aluminum, boron, iron, indium, and/or gallium, preferably boron; Y is a tetravalent element such as silicon, tin, titanium and/or germanium, preferably silicon; and n is at least about 5, such as about 5 to ∞, and usually from about 40 to about ∞. It will be appreciated from the permitted values for n that ITQ-13 can be synthesized in totally siliceous form in which the trivalent element X is absent or essentially absent.

The silicate and borosilicate forms of ITQ-13 can be prepared from a reaction mixture containing sources of water, optionally an oxide of boron, an oxide of tetravalent element Y, e.g., silicon, an organonitrogen directing agent ($RN^{m+}$) as described below and fluoride ions, said reaction mixture having a composition, in terms of mole ratios of oxides, within the following ranges:

| Reactants | Useful | Preferred |
|---|---|---|
| $YO_2/B_2O_3$ | at least 5 | At least 40 |
| $H_2O/YO_2$ | 2–50 | 5–20 |
| $F/RN^{m+}$ | >1.15 m to <2.5 m | 1.25 m to 1.8 m |
| $RN^{m+}/YO_2$ | 0.05–0.7 | 0.2–0.4 |

The organic directing agent $RN^{m+}$ used in the synthesis of ITQ-13 is preferably the hexamethonium [N,N,N,N',N',N'-hexamethyl-1,6-Hexanediaminium] dication and most preferably is hexamethonium dihydroxide. Hexamethonium dihydroxide can readily be prepared by anion exchange of commercially available hexamethonium bromide.

Crystallization of ITQ-13 is preferably carried out at a temperature of about 120° C. to about 160° C. for about 12 hours to about 30 days.

The synthetic porous crystalline material EMM-1 has the structure of the previously hypothetical polymorph C of zeolite beta and in particular is composed of three sets of linear 12-membered ring channels. Table 5 lists the positions of each tetrahedral atom in the unit cell of EMM-1 in nanometers; a range of ±0.05 nm being implied for each coordinate position.

TABLE 5

|     | X      | Y      | Z      |
|-----|--------|--------|--------|
| T1  | 7.918  | 1.599  | 11.501 |
| T2  | 0.000  | 1.501  | 11.385 |
| T3  | 2.462  | 2.462  | 9.750  |
| T4  | 4.892  | 11.211 | 11.501 |
| T5  | 0.000  | 11.309 | 11.385 |
| T6  | 10.348 | 10.348 | 9.750  |
| T7  | 11.211 | 7.918  | 5.001  |
| T8  | 11.309 | 0.000  | 4.885  |
| T9  | 10.348 | 2.462  | 3.250  |
| T10 | 1.599  | 4.892  | 5.001  |
| T11 | 1.501  | 0.000  | 4.885  |
| T12 | 2.462  | 10.348 | 3.250  |
| T13 | 4.892  | 1.599  | 1.499  |
| T14 | 0.000  | 1.501  | 1.614  |
| T15 | 7.918  | 11.211 | 1.499  |
| T16 | 0.000  | 11.309 | 1.614  |
| T17 | 1.599  | 7.918  | 7.999  |
| T18 | 1.501  | 0.000  | 8.115  |
| T19 | 11.211 | 4.892  | 7.999  |
| T20 | 11.309 | 0.000  | 8.115  |
| T21 | 4.892  | 11.211 | 1.499  |
| T22 | 10.348 | 10.348 | 3.250  |
| T23 | 7.918  | 1.599  | 1.499  |
| T24 | 2.462  | 2.462  | 3.250  |
| T25 | 1.599  | 4.892  | 7.999  |
| T26 | 2.462  | 10.348 | 9.750  |
| T27 | 11.211 | 7.918  | 7.999  |
| T28 | 10.348 | 2.462  | 9.750  |
| T29 | 7.918  | 11.211 | 11.501 |
| T30 | 4.892  | 1.599  | 11.501 |
| T31 | 11.211 | 4.892  | 5.001  |
| T32 | 1.599  | 7.918  | 5.001  |

EMM-1 has an X-ray diffraction pattern which is distinguished from the patterns of other known as-synthesized or thermally treated crystalline materials by the lines listed in Table 6 below.

TABLE 6

| d-Spacing (Å)  | Relative Intensity |
|----------------|--------------------|
| 12.51 ± 0.39   | M-S                |
| 9.04 ± 0.26    | M-VS               |
| 5.80 ± 0.15    | VW                 |
| 5.27 ± 0.15    | Vw                 |
| 5.19 ± 0.15    | VW                 |
| 4.55 ± 0.13    | VW-W               |
| 4.21 ± 0.13    | VW                 |
| 4.12 ± 0.12    | VW-W               |
| 4.01 ± 0.11    | VS                 |
| 3.83 ± 0.11    | VW                 |
| 3.57 ± 0.11    | VW                 |
| 3.28 ± 0.09    | VW                 |
| 3.17 ± 0.09    | VW                 |
| 3.03 ± 0.08    | VW                 |
| 2.90 ± 0.08    | VW                 |
| 2.48 ± 0.07    | VW                 |

These X-ray diffraction data were collected with a Scintag diffraction system, equipped with a germanium solid state detector, using copper K-alpha radiation. The diffraction data were recorded by step-scanning at 0.03 degrees of 2-theta, where theta is the Bragg angle, and a counting time of 2 seconds for each step. The interplanar spacings, d's, were calculated in Angstrom units, and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols VS=very strong (80–100), S=strong (60–80), M=medium (40–60), W=weak (20–40), and VW=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

EMM-1 has a composition involving the molar relationship:

$$X_2O_3:(n)YO_2,$$

wherein X is a trivalent element, such as aluminum, boron, iron, indium, and/or gallium; Y is a tetravalent element such as silicon, tin, titanium and/or germanium; and n is at least about 35, such as about 35 to ∞, and usually from about 200 to ∞. Current EMM-1 syntheses have all contained germanium and it is believed that the presence of germanium, either with or without additional tetravalent elements, enhances the stability of the structure.

EMM-1 can be prepared from a reaction mixture containing sources of water, an oxide of a tetravalent element Y, wherein Y comprises germanium and the mole fraction of germanium in Y is 0.2 to 0.5, an organonitrogen directing agent (R) as described below, a trivalent element X as described above, and fluoride ions, said reaction mixture having a composition, in terms of mole ratios of oxides, within the following ranges:

| Reactants      | Useful            | Preferred         |
|----------------|-------------------|-------------------|
| $X_2O_3/YO_2$  | 0 to 0.03         | 0 to 0.01         |
| $H_2O/YO_2$    | 3 to 10           | 4 to 8            |
| $F/RN^{m+}$    | >1.15 m to <2.5 m | 1.25 m to 1.8 m   |
| $RN^{m+}/YO_2$ | 0.1 to 0.5        | 0.13 to 0.25      |

The organic directing agent $RN^{m+}$ used in the synthesis of EMM-1 is preferably selected from the group consisting of aminium cations listed in Table 7.

| Name         | Chemical Abstracts Name                          | Structural Formula                    |
|--------------|--------------------------------------------------|---------------------------------------|
| Hexamethonium | N,N,N,N',N',N'-hexamethyl-1,6-Hexanediaminium | $(CH_3)_3N^+(CH_2)_6N^+(CH_3)_3$ |

-continued

| Name | Chemical Abstracts Name | Structural Formula |
|---|---|---|
| Decamethonium | N,N,N,N',N',N'-hexamethyl-1,10-Decanediaminium | $(CH_3)_3N^+(CH_2)_{10}N^+(CH_3)_3$ |
| Undecamethonium | N,N,N,N',N',N'-hexamethyl-1,11-Undecanediaminium | $(CH_3)_3N^+(CH_2)_{11}N^+(CH_3)_3$ |
| Tetradecamethonium | N,N,N,N',N',N'-hexamethyl-1,14-Tetradecanediaminium | $(CH_3)_3N^+(CH_2)_{14}N^+(CH_3)_3$ |
| (methylpiperidine)$_2$ Diquat$_2$ | 1,1'-(1,2-ethanediyl)bis[1-methyl-Piperidinium |  |
| benzyltrimethyl-ammonium | N,N,N-trimethyl-Benzenemethanaminium | $PhCH_2N^+(CH_3)_3$ |
| bicyclo NEt$_4$ diquat | (3aR,4aS,7aR,8aS)-rel-2,2,6,6-tetraethyl-1,2,3,3a,4,4a,5,6,7,7a,8,8a-dodecahydro-4,8-Ethenobenzo[1,2-c:4,5-c']dipyrrolium, |  |
| tetraethyl ammonium | N,N,N-triethyl-Ethanaminium | $(C_2H_5)_4N^+$ |

Crystallization of EMM-1 is preferably conducted at a temperature of about 135° C. to about 165° C. for about 24 hours to about 30 days.

The invention will now be more particularly described with reference to the following examples.

EXAMPLE 1

Synthesis of EMM-1

10.00 g Syton HT-50 silica (Aldrich), 3.05 g germanium oxide (Aldrich), 9.37 g Hexamethonium dihydroxide (42 wt. % Sachem), 1.40 g HF (48 wt. % hydrofluoric acid, Aldrich) were added to a 1 oz PFA (Nalgene 870 Teflon perfluoroacetoxy) bottle and shaken for 30 minutes to give a thin white solution. After adding the HF, the mixture became a white gel, then turned into a thin white solution after shaking for 2 hr. The pH of the mixture was 9.1 and the mixture had the following molar composition:

0.35 GeO$_2$:1.0 SiO$_2$:0.2 Hexamethonium dihydroxide:0.4 HF:7.5H$_2$O.

Thus the molar ratio of HF/base (Hexamethonium dihydroxide) was 1:1. The bottle was then loaded into a 300 mL autoclave and heated at 150° C. for 11 days. After cooling, the pH was 7.9. The mixture was filtered, washed copiously with water, and dried to constant weight under an IR lamp to give 8.51 g white solid. The solid had the X-ray diffraction pattern of FIG. 1(a) demonstrating the material to be EMM-1 contaminated with a trace amount of ITQ-13.

EXAMPLE 2

Synthesis of EMM-1

The process of Example 1 was repeated except that 51.4 mg of H$_3$BO$_3$ and 200 mg of the product of Example 1, as seeds, were added to the synthesis mixture. The mixture had initial pH of 9.7 and the following molar composition:

0.35 GeO$_2$:1.0 SiO$_2$:0.01H$_3$BO$_3$:0.2 Hexamethonium dihydroxide:0.4 HF:7.5H$_2$O.

Figure 1:
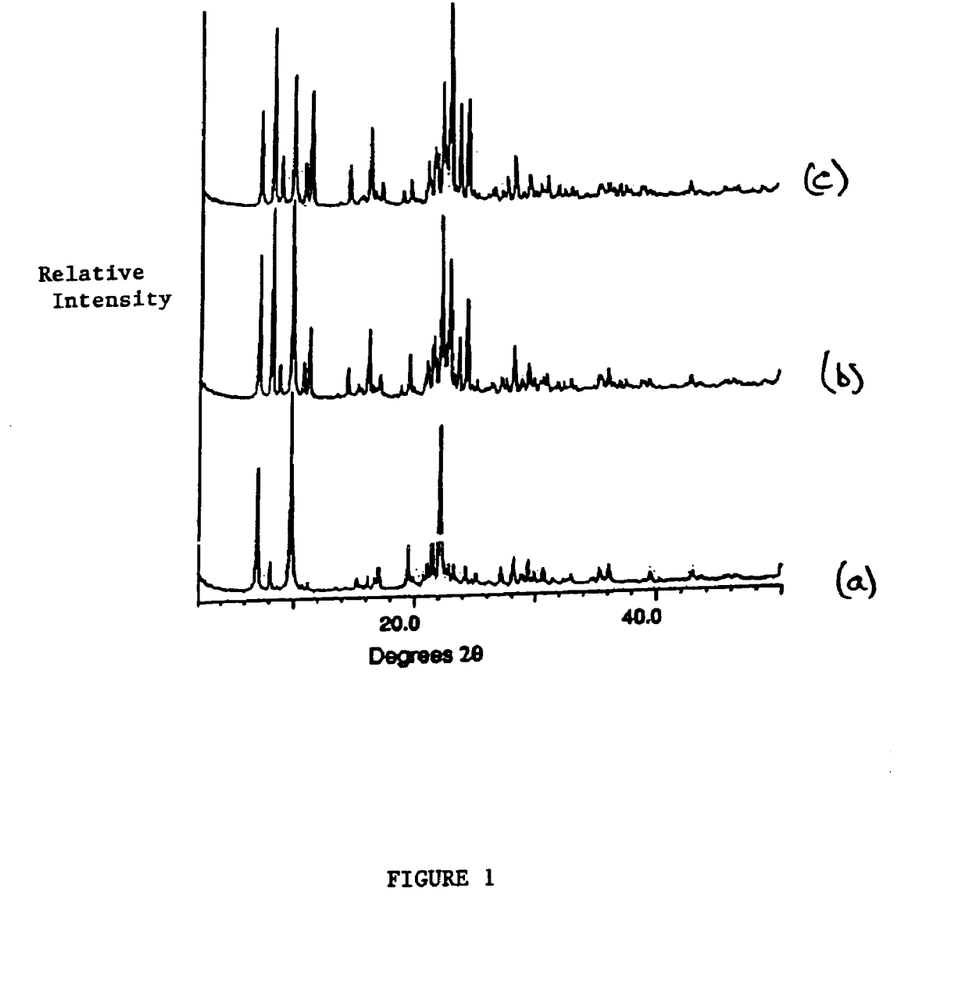

The crystallization was carried out for 14 days. The final pH was 9.0 and 8.41 g of white product was obtained. The product had the X-ray diffraction pattern of FIG. 1(b) which, by comparison with the pattern in FIG. 1(a), showed the material to be a mixture of EMM-1 and ITQ-13.

EXAMPLE 3

Synthesis of EMM-1

The process of Example 2 was repeated except that 103 mg of H$_3$BO$_3$ were used instead of the 51.4 mg H$_3$BO$_3$ used in Example 2. The mixture had an initial pH of 9.5 and the following molar composition:

0.35 GeO$_2$:1.0 SiO$_2$:0.02H$_3$BO$_3$:0.2 Hexamethonium dihydroxide:0.4 HF:7.5H$_2$O.

The crystallization was carried out for 14 days. The final pH was 8.8 and 8.57 g of white product were obtained. The product had the X-ray diffraction pattern of FIG. 1(c) which, by comparison with the patterns in FIGS. 1(a) and (b), indicates the material to be a mixture of EMM-1 with a predominant amount of ITQ-13.

EXAMPLE 4

Synthesis of EMM-1

10.00 g Syton HT-50 silica (Aldrich), 3.05 g germanium oxide (Aldrich), 51.4 mg H$_3$BO$_3$, 7.17 g Hexamethonium (54.9 wt. % Sachem), 200 mg product of Example 1 (seeds), 1.53 g H$_2$O, and 2.60 g HF (48 wt % hydrofluoric acid, Aldrich) were added to a 1 oz PFA bottle and shaken for 30 minutes to give a thin, white solution with a little solids settling to the bottom. The pH of the mixture was 9.0 and the mixture had the following molar composition:

0.35 GeO$_2$:1.0 SiO$_2$:0.01H$_3$BO$_3$:0.2 Hexamethonium dihydroxide:0.75 HF:7.5H$_2$O.

Figure 2:
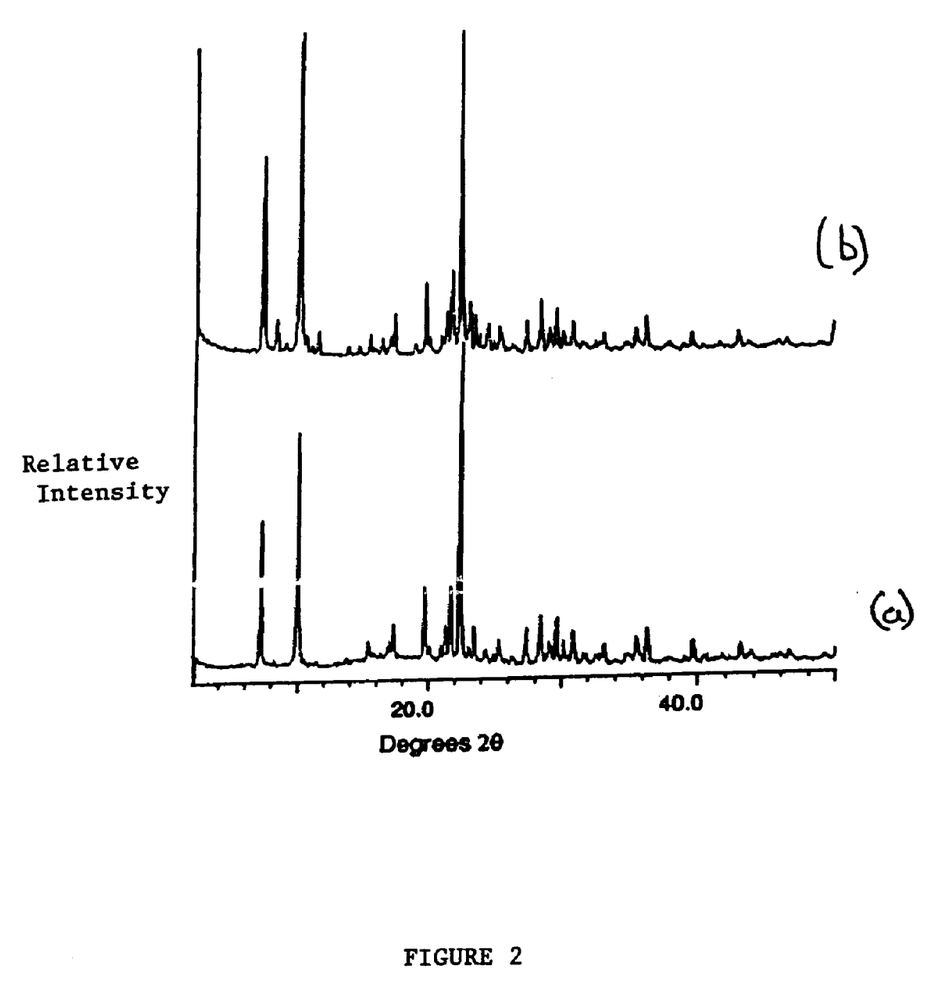

Thus the molar ratio of HF/base (Hexamethonium dihydroxide) was 1.87:1. The bottle was placed in a 300 mL autoclave and heated for 14 days at 150° C. The final pH was 8.0. After washing, filtration, and drying to constant weight under an IR lamp there were obtained 8.61 g of a white solid. The solid had the X-ray diffraction pattern of FIG. 2(a) demonstrating the material to be pure EMM-1.

EXAMPLE 5

Synthesis of EMM-1

156.2 g Syton HT-50 silica (Aldrich), 47.60 g germanium oxide (Aldrich), 1.61 g $H_3BO_3$, 111.96 g Hexamethonium dihydroxide (54.9 wt. % Sachem), 29.8 g HF (48 wt. % hydrofluoric acid, Aldrich), 18.02 g $H_2O$, and 3.12 g product of Example I (seeds) to a 500 mL polypropylene bottle were added and shaken for 30 minutes to give a thin, white solution with a little solids settling to the bottom. The pH of the mixture was 9.0 and the mixture had the following molar composition:

0.35 $GeO_2$:1.0 $SiO_2$:0.02$H_3BO_3$:0.2 Hexamethonium dihydroxide:0.55 HF:7.1$H_2O$.

Thus the molar ratio of HF/base (Hexamethonium dihydroxide) was 1.38:1. The bottle was placed in a 2 L autoclave and heated for 5 days at 150° C. The final pH was 8.5. After washing, filtration, and drying to constant weight under an IR lamp there were obtained 137 g of a white solid. The solid had the X-ray diffraction pattern of FIG. 2(b) demonstrating the material to be EMM-1 contaminated with a trace amount of ITQ-13.

EXAMPLE 6

Synthesis of ITQ-13

5.00 g silica (UltraSil VN 3SP-PM), 51 mg $H_3BO_3$ and 13.11 g Hexamethonium dihydroxide (42% Sachem) were added to a I oz PFA bottle. The mixture was shaken and then allowed to stand for 3 days, whereafter 100 mg all-silica ITQ-13 (seeds) followed by 1.71 g $H_2O$ and 2.25 g HF (48%) were added to the mixture. The mixture was shaken 3 hr to give a synthesis composition with a pH of 10.0 and a molar composition of:

$SiO_2$:0.01$H_3BO_3$:0.28 Hexamethonium dihydroxide:0.65 HF:7$H_2O$.

Figure 3:
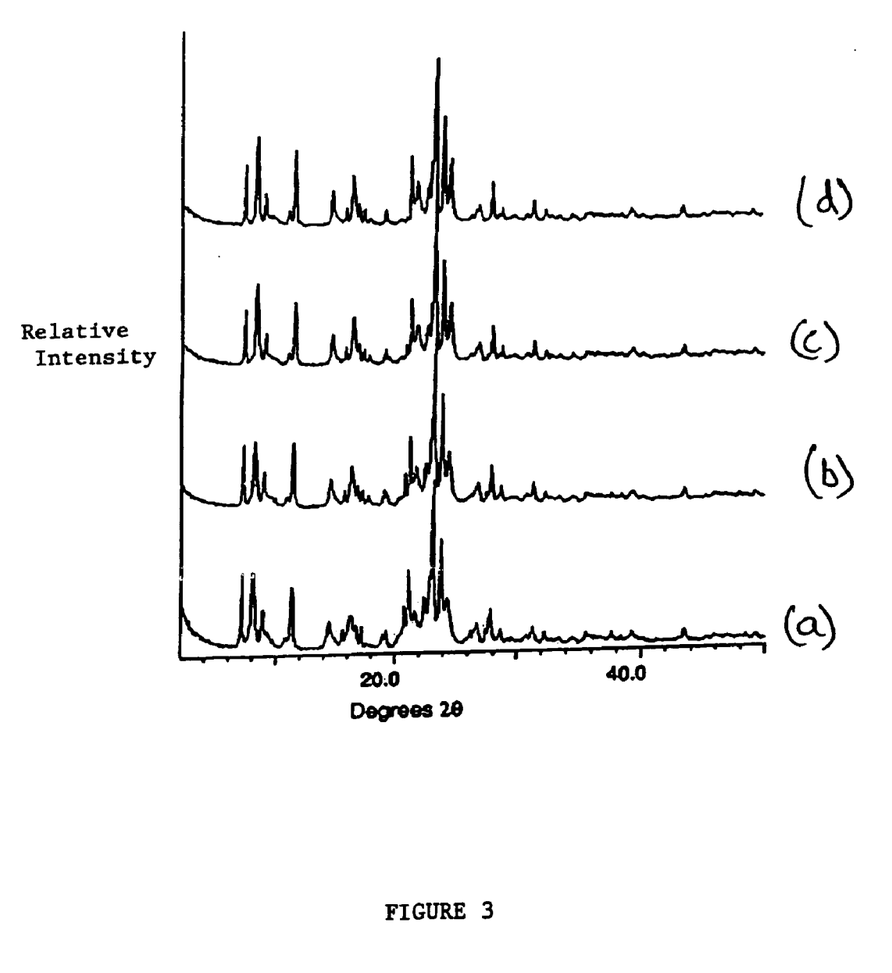
Figure 4:
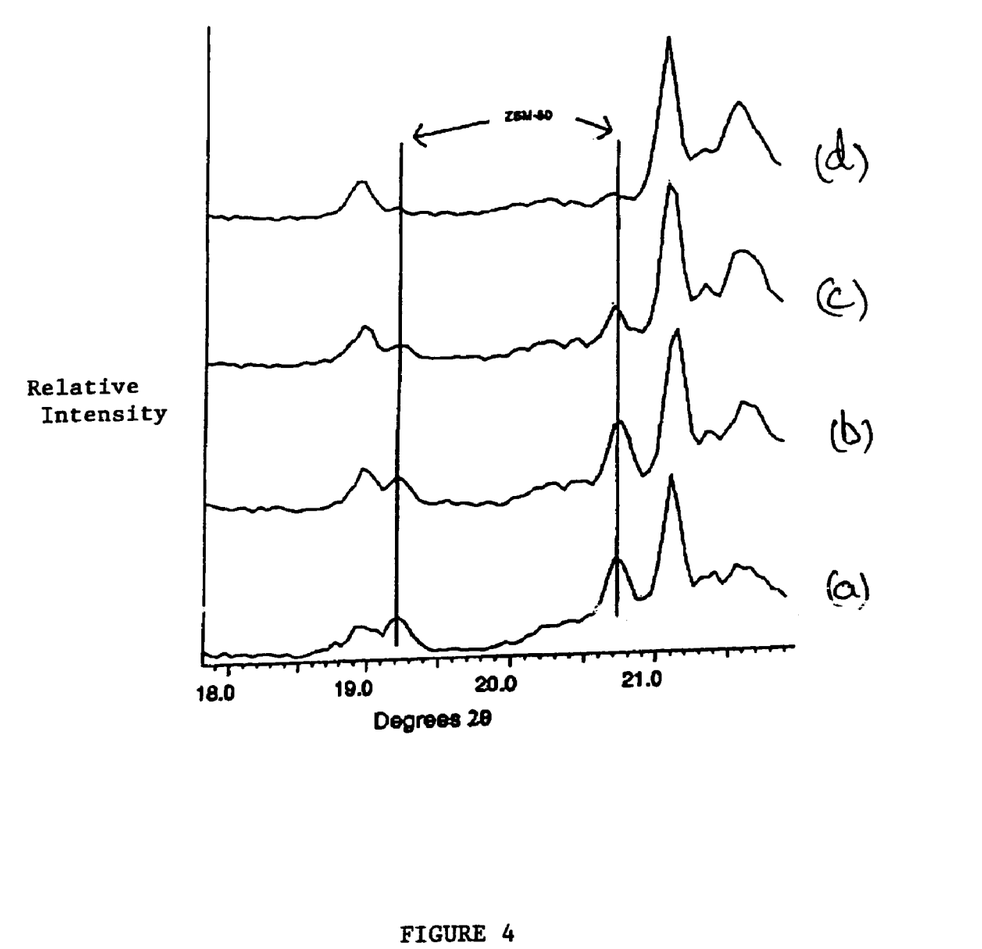

Thus the molar ratio of HF/base (Hexamethonium dihydroxide) was 1.16:1. The bottle was placed in a 300 mL autoclave and the mixture heated for 21 days at 135° C. The final pH was 9.7. The product was filtered, washed copiously with water, and dried to constant weight under an IR lamp to give 5.01 g white solid. The solid had the X-ray diffraction pattern of FIG. 3(a) demonstrating the material to be ITQ-13 contaminated with ZSM-50. The presence of the ZSM-50 impurity can be seen more clearly in FIG. 4(a) which is an enlargement of the area of the pattern in FIG. 3(a) between 19 and 21 degrees 2-theta. The lines at d-spacings of 4.68 Å (19.0 degrees 2-theta) for ITQ-13 and 4.59 Å (19.3 degree 2-theta) for ZSM-50 give an easy, qualitative indication of the relative concentration of the two species.

EXAMPLE 7

Synthesis of ITQ-13

The process of Example 6 was repeated but with the $H_2O$ addition being reduced to 1.53 g and the HF (48%) addition increased to 2.60 g. After shaking for 3 hr, the mixture had a pH 9.9 and the molar ratio of HF/base was 1.34:1. The bottle was placed in a 300 mL autoclave and the mixture heated 21 days at 135° C. The final pH was 9.7. The product was filtered, washed copiously with water, and dried to constant weight under an IR lamp to give 5.25 g white solid. The solid had the X-ray diffraction pattern of FIGS. 3(b) and 4(b) demonstrating the material to be ITQ-13 contaminated with a lesser amount of ZSM-50 than the product of Example 6.

EXAMPLE 8

Synthesis of ITQ-13

The process of Example 6 was repeated but with the $H_2O$ addition being 1.35 g and the HF (48%) addition being 2.95 g. After shaking for 3 hr, the mixture had a pH 9.7 and the molar ratio of HF/base was 1.52:1. The bottle was placed in a 300 mL autoclave and the mixture heated 21 days at 135° C. The final pH was 9.5. The product was filtered, washed copiously with water, and dried to constant weight under an IR lamp to give 4.93 g white solid. The solid had the X-ray diffraction pattern of FIGS. 3(c) and 4(c) demonstrating the material to be ITQ-13 contaminated with a lesser amount of ZSM-50 than either of the products of Examples 6 and 7.

EXAMPLE 9

Synthesis of ITQ-13

The process of Example 6 was repeated but with the $H_2O$ addition being 1.20 g and the HF (48%) addition being 3.29 g. After shaking for 3 hr, the mixture had a pH 9.7 and the molar ratio of HF/base was 1.70:1. The bottle was placed in a 300 mL autoclave and the mixture heated 21 days at 135° C. The final pH was 8.9. The product was filtered, washed copiously with water, and dried to constant weight under an IR lamp to give 4.57 g white solid. The solid had the X-ray diffraction pattern of FIGS. 3(d) and 4(d) demonstrating the material to be ITQ-13 with little or no ZSM-50 contamination.

EXAMPLE 10

Figure 5:
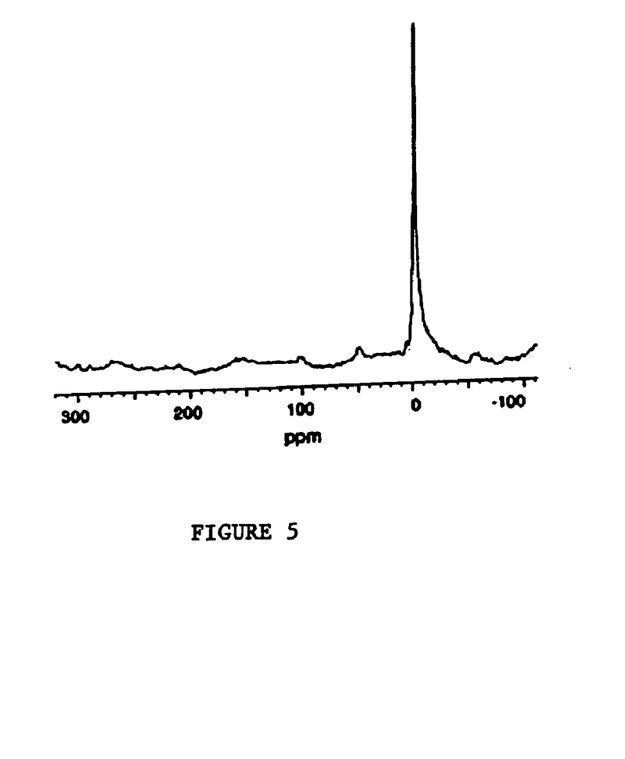
FIG. 5 is a magic angle spinning (MAS) B-nmr spectrum of the calcined product of Example 10.

The material of Example 9 was heated at 2° C./min to 540° C. under flowing $N_2$, held at this temperature for 8 hr under $N_2$ and then for a further 8 hr under dry air to give 3.93 g of a white solid. As shown in FIG. 5, characterization of the resultant material by magic angle spinning (MAS) B-nmr showed that the boron had been incorporated into the ITQ-13 framework as shown by a peak at −3.0 ppm. Integration of this peak against a weighed sample of B-ZSM-5 with known boron concentration indicated the B concentration to be 1900 ppm, within experimental error of the concentration expected (1800 ppm if the boron had been incorporated into the framework at the same ratio it was present in the synthesis mixture).

EXAMPLE 11

Figure 6:
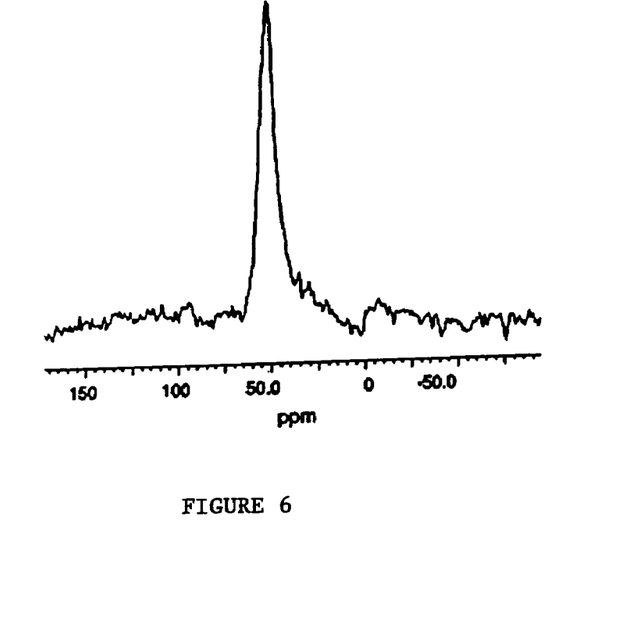
FIG. 6 is a magic angle spinning (MAS) Al-nmr spectrum of the calcined product of Example 11.

The material of Example 10 (3.15 g) was placed in 37.79 g of $H_2O$ in a Teflon autoclave liner, 6.88 g $Al(NO_3)_3$ 9$H_2O$ added. The liner was placed in an autoclave and heated at 135° C. with stirring at 60 RPM for 3 days. The solid was washed to increase the pH to >5.5 then the solid was ammonium exchanged by three successive treatments with 10 mL of 1.2 M $NH_4NO_3$ (pH adjusted to 8–9 with $NH_4OH$). The solid was separated from the wash at each step by centrifuging. The final product was obtained as 3.13 g of a white solid after drying to constant weight at 80° C. As shown in FIG. 6, characterization of the resultant material by magic angle spinning (MAS) Al-nmr showed that the aluminum had been incorporated into the ITQ-13 framework as shown by a peak at 54.5 ppm. Integration of the Al-nmr peak versus a weighed sample of Al-ZSM-5 showed the concentration of Al in the framework to be 1900 ppm. The material was catalytically active with an alpha value of 15.

What is claimed is:

1. A process for synthesizing a porous crystalline material which comprises:

(i) preparing a mixture capable of forming said material, said mixture comprising sources of water, an oxide of a tetravalent element Y, an oxide of a trivalent element X, wherein X is selected from the group consisting of aluminum, boron, gallium, iron, and indium, fluoride ions, and an organonitrogen cation $RN^{m+}$ capable of directing the synthesis of said material, wherein HF is the source of the fluoride ions and the molar ratio of said fluoride ions to said organonitrogen cations $RN^{m+}$ in said mixture is greater than 1.15 m but less than 25 m;

(ii) maintaining said mixture under crystallization conditions until crystals of said material are formed; and (iii) recovering said crystalline material from (ii).

2. The process of claim 1, wherein the molar ratio of said fluoride ions to said organonitrogen cations $RN^{m+}$ in said mixture is from about 1.25 m to about 1.8 m.

3. The process of claim 1, wherein the molar ratio of the components of said mixture are as follows:

| | |
|---|---|
| $YO_2/X_2O_3$ | at least 5 |
| $H_2O/YO_2$ | 2–50 |
| $F/RN^{m+}$ | >1.15 m to <2.5 m |
| $RN^{m+}/YO_2$ | 0.1/m–1.4/m. |

4. The process of claim 1, wherein the molar ratio of the components of said mixture are as follows:

| | |
|---|---|
| $YO_2/X_2O_3$ | at least 40 |
| $H_2O/YO_2$ | 5–20 |
| $F/RN^{m+}$ | 1.25 m to 1.8 m |
| $RN^{m+}/YO_2$ | 0.2/m–0.8/m. |

5. The process of claim 1, wherein said tetravalent element Y includes silicon.

6. The process of claim 5, wherein said mixture contains an inorganic source of silica.

7. The process of claim 1, wherein said crystallization conditions include a temperature of about 100° C. to about 200° C. for a time of about 36 hours to about 30 days.

8. The process of claim 1, wherein said porous crystalline material is selected from the group consisting of zeolite beta, chabazite, CIT-5, ITQ-3, ITQ-4, ITQ-7, ITQ-9, ITQ-10, ITQ-12, SSZ-23, SSZ-24, SSZ-31 and ZSM-12.

9. The process of claim 1, wherein said porous crystalline material has the X-ray diffraction pattern set out in Table 2 of the specification.

10. The process of claim 1, wherein said porous crystalline material has the X-ray diffraction pattern set out in Table 4 of the specification.

11. The process of claim 1, wherein said porous crystalline material has the X-ray diffraction pattern set out in Table 6 of the specification.

* * * * *